V. ROYLE.
CORE BRIDGE FOR TUBING MACHINES.
APPLICATION FILED JUNE 13, 1919.
1,371,576.
Patented Mar. 15, 1921.
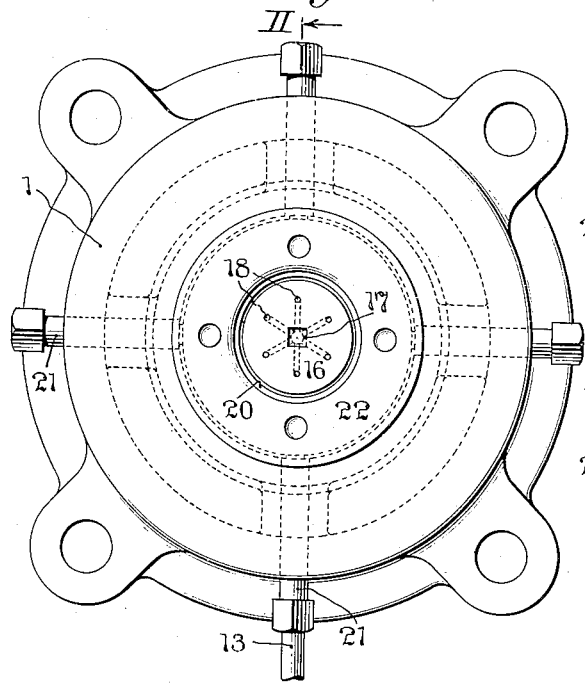
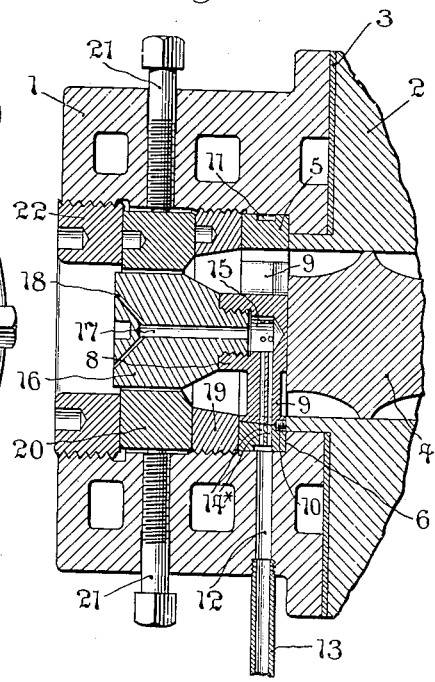
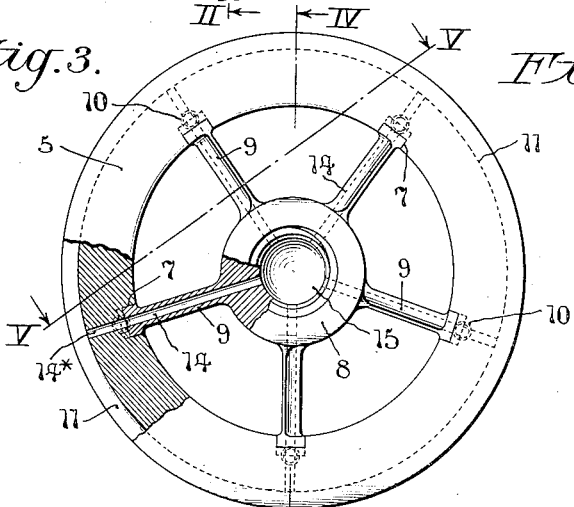
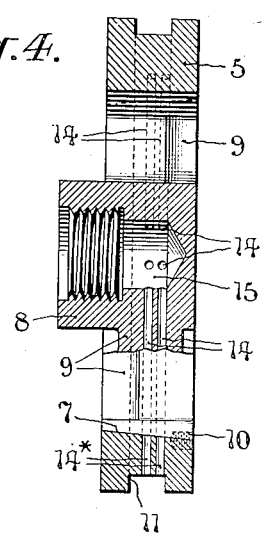
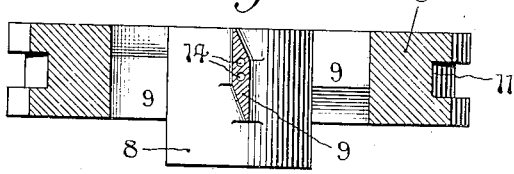
Inventor:
Vernon Royle
by his attorneys

UNITED STATES PATENT OFFICE.

VERNON ROYLE, OF PATERSON, NEW JERSEY.

CORE-BRIDGE FOR TUBING-MACHINES.

1,371,576.

Specification of Letters Patent. Patented Mar. 15, 1921.

Application filed June 13, 1919. Serial No. 303,988.

*To all whom it may concern:*

Be it known that I, VERNON ROYLE, a citizen of the United States, and resident of Paterson, in the county of Passaic and State of New Jersey, have invented a new and useful Improvement in Core-Bridges for Tubing-Machines, of which the following is a specification.

This invention relates to an improvement in core bridges for tubing machines, with the object in view of providing such a device which is very strong and rigid in construction, while delicate and refined in outline so as to present a minimum of resistance and interruption to the passage of the plastic material.

Another object consists in providing certain improvements in the form, construction and arrangement of the parts constituting my invention, whereby the above named and other objects may be effectively attained.

A practical embodiment of the invention is represented in the accompanying drawings in which, Figure 1 represents a face view of the head of a tubing machine.

Fig. 2 represents a section taken in the plane of the line II—II of Fig. 1, looking in the direction of the arrows.

Fig. 3 represents a detail face view, partly in section, on a larger scale, of the core bridge.

Fig. 4 represents a section taken in the plane of the line IV—IV of Fig. 3, looking in the direction of the arrows, and Fig. 5 represents a section taken in the plane of the line V—V of Fig. 3, looking in the direction of the arrows.

The front piece of the head of the machine is denoted by 1, and it is secured in any well known or desired manner to the head 2. A suitable packing ring or washer 3 may be inserted between the parts 1 and 2, if desired. The screw or plodder is indicated by 4 and may be of any well known and approved form, and be driven in any appropriate manner.

The core bridge, which constitutes the means for supporting the core that is to determine the interior contour of the tube being produced, is the part which embodies my present invention. It includes an annular outer member 5 that is designed to be seated in a corresponding recess 6 fashioned in the front piece 1. The member 5 is provided on its inner periphery with five axially extending recesses, denoted by 7; the rear walls of which grooves are tapered so as to lie at an angle to the axis of the member 5.

A core supporting hub 8 has five radiating arms 9, each of which arms has an enlarged tapered head fitted to seat in a recess 7. The taper of the recesses 7 and of the heads of the arms 9 converges forwardly or toward the front of the head, so that the pressure of the plastic material which is forced forwardly by the screw 4 will tend to firmly seat the arms 9 in the annular member 5. Set screws 10 serve to lock the arms 9 in the member 5. Each of the arms 9 is rhomboidal in cross section so as to permit the ready passage of the plastic material (rubber or the like), and not to cause too great separation thereof.

As is well known, it is desirable to supply a non-adhesive medium such as soap-stone powder to the interior of the tube formed so that the walls thereof will not adhere to each other when the tube collapses after passing from the machine. To this end I provide the member 5 with a peripheral groove 11, which is adapted to register with a passage 12 in the front piece 1, that communicates with a pipe 13 leading from a suitable source of supply of soap-stone powder or equivalent material. Each of the arms 9 is traversed by a pair of holes 14 that, through corresponding holes 14* in the member 5, open into the groove 11, and also open into a chamber 15 formed in the core supporting hub 8.

In manufacturing the core 7, it will be seen that the outer member 5 may be machined from steel, and that the inner member 8, 9, may also be machined from steel and associated with the outer member. This method of construction enables the production of a very strong yet light device of this character and greatly promotes the efficiency of the machine.

The hub 8 is interiorly screw threaded for receiving the exteriorly threaded end of the core 16, and the said core has a central passage 17 which opens into the chamber 15 and also communicates with a set of smaller passages 18 that open at the front end of the core 16. These passages 17 and 18 serve to permit the soap-stone powder to pass from the chamber 15 through the core and into the tube being formed. I have found that a pair of small holes 14 in each arm 9 is desirable, and the provision of a continuous groove 11 eliminates any chance of a failure of communication between the holes 14 and the passage 12, owing to a change in the rotary adjustment of the member 5.

A bridge binder ring 19 is threaded into the front piece 1 and interposed between the member 5 and the die 20, which latter is adjustably held in place by radially disposed cap screws 21 threaded in the front piece 1. A locking ring 22 screws into the front piece 1 and serves to firmly hold the core bridge, spacing ring and die in place.

I believe that the operation of my invention will be clear from the foregoing description, but I may say that various changes may be resorted to in the form, construction and arrangement of the several parts without departing from the spirit and scope of my invention, and hence I do not intend to be limited to the details herein shown and described, except as they may be included in the claims.

What I claim is:

1. A device of the character described comprising, an annular outer member having a plurality of axially tapered recesses, an inner core supporting member having a plurality of arms provided with heads tapered to correspond with the taper of the said recesses, the said members being fitted together with the said heads in the said recesses, and means engaging the heads and outer member for locking them together.

2. A device of the character described comprising, an annular outer member having a plurality of axially tapered recesses, an inner core-supporting member having a plurality of arms provided with heads tapered to correspond with the taper of the said recesses, the said members being fitted together with the said heads in the said recesses, and set screws for locking the said members together.

3. A device of the character described comprising, an annular outer member provided with a peripheral groove, and an inner core supporting member connected with the outer member by a plurality of arms, each of said arms having a plurality of longitudinal holes extending therethrough and communicating with said groove, the said groove being adapted to register with a source of non-adhesive powder supply.

4. A device of the character described comprising, an annular outer member provided with a peripheral groove, and an inner core supporting member connected with the outer member by a plurality of arms, said core-supporting member having a hub provided with a chamber, each of said arms having a plurality of longitudinal holes extending therethrough and opening communication between the groove and the chamber, the said groove being adapted to register with a source of non-adhesive powder supply.

5. A device of the character described comprising, an annular outer member, and an inner core-supporting member connected with the outer member by a plurality of arms, said arms being rhomboidal in cross section, and having its sides substantially parallel to the axis of the core.

6. A device of the character described comprising, an annular outer member, and an inner core-supporting member connected with the outer member by a plurality of arms, said arms having a cross-sectional shape of an elongated rhomboid, with its sides substantially parallel to the axis of the core.

In testimony that I claim the foregoing as my invention, I have signed my name, this third day of June, 1919.

VERNON ROYLE.